R. Fink,
Lifting Jack.
Nº 47,628.  Patented May 9, 1865.
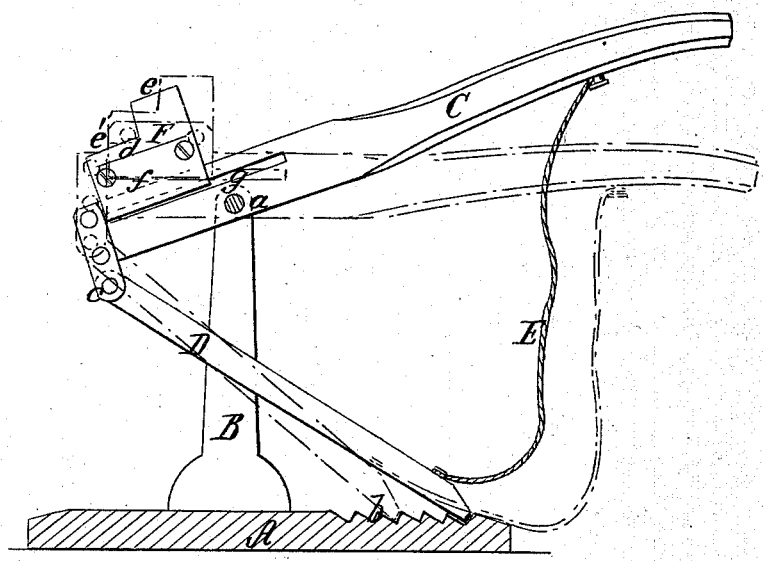
Witnesses;
Inventor;
R Fink

UNITED STATES PATENT OFFICE.

REUBEN FINK, OF BATAVIA, ILLINOIS.

IMPROVEMENT IN CARRIAGE-JACKS.

Specification forming part of Letters Patent No. 47,628, dated May 9, 1865.

*To all whom it may concern:*

Be it known that I, R. FINK, of Batavia, in the county of Kane and State of Illinois, have invented a new and Improved Carriage-Jack; and I do hereby declare that the following is a full, clear, and exact description thereof, which will enable those skilled in the art to make and use the same, reference being had to the accompanying drawing, forming part of this specification.

The drawing represents a side sectional view of my invention.

The object of this invention is to obtain a simple and efficient jack which may be applied to the axles of either light or heavy wheel vehicles, and both to the front and back axles of the same vehicle, for the purpose of raising the axles to admit of the ready removal of the wheels and replacing the same for lubricating purposes.

A represents a base-plate, having one or more uprights, B, secured to it to support a lever, C, the fulcrum-pin $a$ of which passes through the former.

The base-plate A has a series of notches, $b$, made in its upper surface, said notches extending from the center of one end toward the uprights B; and D is a bar, one end of which is connected by a joint, $c$, to the short arm of lever C near its end, the bar D engaging with the notches $b$ and having a greater or less inclination at all times when supporting the lever C. The lower end of bar D is connected by a chain or cord, E, with lever C, as shown in the drawing.

On the lever C there is placed a slide, F, having a notch or recess, $d$, in its upper surface to form two different bearings, $e\ e'$, for axles. This slide F is provided with a plate, $f$, at each side, and these plates extend down by the sides of the lever C and have their lower parts bent inward or toward each other to fit in an oblong slot, $g$, in the lever, the length of said slot determining the length of the movement of slide F.

By this means the slide F may be adjusted on the lever to suit axles of different heights. The bearing $e$ is designed for the axles of heavy vehicles and the bearings $e'$ for those of light vehicles. A fixed bearing may be used instead of a sliding one, F, but the latter is far preferable.

When the slide is adjusted under the axle, the longer arm of lever C is pressed down, and the bar D, in consequence of its lower end engaging with the notches $b$, sustains the lever and the weight upon slide F.

The jack is disengaged from the axle by pulling the cord or chain E, and thereby freeing the lower end of bar D from the notches $b$.

By this arrangement a very simple, economical, and durable lifting or carriage jack is obtained, and one which may be very readily applied to and detached from the axles of all ordinary vehicles.

I claim as new and desire to secure by Letters Patent—

1. The lever C, in connection with a fixed bearing or a sliding one, F, bar D, and notches $b$ in the base A, all arranged substantially as and for the purpose specified.

2. The cord or chain E, connected to the bar D and lever C, substantially as and for the purpose set forth.

R. FINK.

Witnesses:
A. L. WELLS,
J. A. FINK.